US008882328B2

(12) United States Patent
Kinder

(10) Patent No.: US 8,882,328 B2
(45) Date of Patent: Nov. 11, 2014

(54) INPUT EDGE COUPLER HAVING TAPER REGION

(75) Inventor: Brian A. Kinder, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 13/130,528

(22) PCT Filed: Nov. 23, 2009

(86) PCT No.: PCT/US2009/065504
§ 371 (c)(1),
(2), (4) Date: May 20, 2011

(87) PCT Pub. No.: WO2010/060029
PCT Pub. Date: May 27, 2010

(65) Prior Publication Data
US 2011/0228559 A1    Sep. 22, 2011

Related U.S. Application Data

(60) Provisional application No. 61/117,376, filed on Nov. 24, 2008.

(51) Int. Cl.
*F21V 7/04*    (2006.01)
*F21V 8/00*    (2006.01)
(52) U.S. Cl.
CPC ............ *G02B 6/0028* (2013.01); *G02B 6/0036* (2013.01)
USPC ............................. 362/628; 362/616; 362/615

(58) Field of Classification Search
USPC ........... 362/23.16, 23.17, 608–610, 621–622, 362/615–616, 628; 349/62, 64, 65
See application file for complete search history.

(56) References Cited

U.S. PATENT DOCUMENTS

| | | | |
|---|---|---|---|
| 3,695,131 A | | 10/1972 | Zimmermann |
| 4,292,867 A | | 10/1981 | Stoffels et al. |
| 4,576,850 A | | 3/1986 | Martens |
| 4,693,157 A | | 9/1987 | Looser |
| 4,906,070 A | | 3/1990 | Cobb, Jr. |
| 5,056,892 A | | 10/1991 | Cobb, Jr. |
| 5,613,751 A | | 3/1997 | Parker et al. |
| 5,618,096 A | | 4/1997 | Parker et al. |
| 5,967,637 A | | 10/1999 | Ishikawa et al. |
| 6,164,789 A | * | 12/2000 | Unger et al. ................... 362/610 |
| 7,001,058 B2 | | 2/2006 | Inditsky |
| 7,102,705 B2 | * | 9/2006 | Kim et al. ......................... 349/65 |
| 7,188,989 B2 | * | 3/2007 | Miyashita ..................... 362/621 |
| 7,628,527 B2 | * | 12/2009 | Kim et al. ...................... 362/621 |
| 7,677,783 B2 | * | 3/2010 | Wei et al. ....................... 362/612 |
| 2002/0141174 A1 | | 10/2002 | Parker et al. |
| 2004/0135273 A1 | | 7/2004 | Parker et al. |

(Continued)

FOREIGN PATENT DOCUMENTS

| | | |
|---|---|---|
| EP | 0048052 A1 | 3/1982 |
| EP | 0075474 A2 | 3/1983 |

(Continued)

*Primary Examiner* — Robert May
(74) *Attorney, Agent, or Firm* — Robert S. Moshrefzadeh

(57) ABSTRACT

A light guide includes a substrate having opposing first and second major surfaces and an input edge coupler disposed along an edge of the substrate. The ratio of a light guide input edge thickness to a light guide thickness is greater than 2:1.

2 Claims, 6 Drawing Sheets

(56) References Cited

U.S. PATENT DOCUMENTS

| | | |
|---|---|---|
| 2005/0259939 A1 | 11/2005 | Rinko |
| 2006/0083028 A1* | 4/2006 | Sun et al. .................. 362/615 |
| 2006/0269189 A1 | 11/2006 | Seo |
| 2007/0047254 A1 | 3/2007 | Schardt et al. |
| 2007/0279935 A1 | 12/2007 | Gardiner et al. |
| 2008/0106915 A1 | 5/2008 | Okuda |
| 2008/0151142 A1 | 6/2008 | Noba |
| 2008/0232135 A1 | 9/2008 | Kinder et al. |
| 2011/0222311 A1 | 9/2011 | Kinder |

FOREIGN PATENT DOCUMENTS

| | | |
|---|---|---|
| EP | 0048052 B2 | 4/1985 |
| EP | 0974785 | 1/2000 |
| JP | 2001-307525 | 11/2001 |
| JP | 2003-272428 | 9/2003 |
| JP | 2004-341322 | 12/2004 |
| WO | WO 00-50807 | 8/2000 |
| WO | WO 2005-107363 | 11/2005 |
| WO | WO 2010-059931 | 5/2010 |
| WO | WO 2010-060033 | 5/2010 |

* cited by examiner

INPUT EDGE COUPLER HAVING TAPER REGION

CROSS REFERENCE TO RELATED APPLICATIONS

This application is a national stage filing under 35 U.S.C. 371 of PCT/US2009/065504, filed on Nov. 23, 2009, which claims priority to U.S. Provisional Application No. 61/117,376, filed on Nov. 24, 2008, the disclosure of which is incorporated by reference in its/their entirety herein.

BACKGROUND

Optical displays, such as liquid crystal displays (LCDs), have become increasingly commonplace, finding use for example in desktop and laptop computer monitors, televisions, mobile phones, digital cameras, pocket-sized digital music players, and other hand-held devices. In addition to becoming more prevalent, LCDs are becoming thinner as the manufacturers of electronic devices incorporating LCDs strive for smaller package sizes.

An LCD is built around a liquid crystal (LC) panel. Because LC panels do not create light themselves, an LCD requires a source of illumination—typically either reflected ambient light, or more commonly, light from a backlight. A backlight generally includes at least one light source and other optical components that work together to deliver light to the LC panel.

SUMMARY

In one aspect, the present disclosure provides a light guide including first and second flexible layers. The first flexible layer has a first flexible layer thickness and opposing first and second major surfaces. The second flexible layer has a second flexible layer thickness and opposing first and second major surfaces. The first major surface of the first flexible layer is in physical contact with the second major surface of the second flexible layer. Furthermore, the second flexible layer further integrally includes a plurality of discrete light extractors capable of extracting light propagating in the light guide such that light is extracted in a pre-determined extraction pattern over the first major surface of the second flexible layer and an input edge coupler capable of bringing light from at least one exterior light source into propagation within the light guide. The input edge coupler includes an input edge having an input edge thickness disposed along an edge of the light guide, where the input edge is suited for receiving light from the at least one exterior light source, and a taper region.

In another aspect, the present disclosure provides a light guide including a flexible substrate and an input edge coupler. The flexible substrate has opposing first and second major surfaces. The input edge coupler includes an input edge having an input edge thickness disposed along an edge of the substrate, and a taper region. The input edge exhibits a first microstructure different than a second microstructure exhibited by at least one other edge of the light guide.

In yet another aspect, the present disclosure provides a light guide that includes a substrate having opposing first and second major surfaces and an input edge coupler disposed along an edge of the substrate, where the ratio of a light guide input edge thickness to a light guide thickness is greater than 2:1.

In still another aspect, the present disclosure provides a light guide that includes a substrate having opposing first and second major surfaces integrally comprising a tapered input edge coupler and a continuous extraction layer in physical contact with the substrate comprising a plurality of discrete light extractors capable of extracting light propagating in the light guide such that light is extracted in a pre-determined extraction pattern over the extraction layer.

In yet still another aspect, the present disclosure provides a light guide including a substrate and an input edge coupler. The substrate includes a substrate material and has a first major surface and a second major surface. The input edge coupler includes a coupler material and further includes an input edge disposed along an edge of the substrate and a taper region. In this light guide, the substrate material and coupler material are different.

In still yet another aspect, the present disclosure provides an optical system including a light guide, one or more light sources, and a light valve panel. The light guide includes a first flexible layer having a first flexible layer thickness and opposing first and second major surfaces and a second flexible layer having a second flexible layer thickness and opposing first and second major surfaces, such that the first major surface of the first flexible layer is in physical contact with the second major surface of the second flexible layer. Further, the second flexible layer includes a plurality of discrete light extractors capable of extracting light propagating in the light guide such that light is extracted in a pre-determined extraction pattern over the first major surface of the second flexible layer. The second flexible layer also includes an input edge coupler that has an input edge disposed along an edge of the light guide, capable of receiving light and having an input edge thickness and a taper region. The one or more light sources are disposed to emit light into the light guide via the input edge. The light valve panel is disposed to receive light extracted over the first major surface of the second flexible layer of the light guide.

In an additional aspect, the present disclosure provides a web including a flexible substrate and a flexible extraction layer. The flexible substrate has a flexible substrate thickness and opposing first and second major surfaces, and the flexible substrate has a ratio of downweb dimension to crossweb dimension of at least 10:1. The flexible extraction layer has a flexible extraction layer thickness and opposing first and second major surfaces. The first major surface of the flexible substrate is in physical contact with the second major surface of the flexible extraction layer. In addition, the flexible extraction layer further includes at least one light guide region having a plurality of discrete light extractors capable of extracting light propagating in the flexible substrate such that light is extracted in a pre-determined extraction pattern over the at least one light guide region of the flexible extraction layer, and an input edge coupler. The input edge coupler has a plateau region disposed along an edge of the at least one light guide region, characterized by a plateau thickness, and a taper region adjacent the plateau region. The web may be converted to result in a plurality of light guides.

In another additional aspect, the present disclosure provides a method for manufacturing light guides, including the steps of providing a flexible substrate having a flexible substrate thickness and opposing first and second major surfaces, disposing a flexible layer onto the flexible substrate, the flexible layer having a flexible layer thickness and opposing first and second major surfaces such that the first major surface of the flexible substrate is in physical contact with the second major surface of the flexible layer, microreplicating at least one light guide region on the flexible layer, and converting the flexible substrate and flexible layer to result in a plurality of light guides. The step of microreplicating at least one light guide region on the flexible layer further includes the steps of microreplicating a plurality of discrete light extractors capable of extracting light propagating in the flexible substrate such that light is extracted in a pre-determined extraction pattern over the at least one light guide region of the flexible layer, and microreplicating an input edge coupler, where the input edge coupler has a plateau region disposed along an edge of the at least one light guide region, characterized by a plateau thickness, and a taper region adjacent the plateau region.

These and other aspects of the present disclosure will be apparent from the detailed description below. In no event, however, should the above summaries be construed as limitations on the claimed subject matter.

BRIEF DESCRIPTION OF THE DRAWINGS

The present disclosure is described with respect to the appended Figures, wherein.

DETAILED DESCRIPTION

One type of backlight for an LCD includes a light guide in the form of a slab or wedge, often of an optically transparent polymeric material. In such a backlight, one or more light sources may project light into the light guide from one or more edges of the light guide. Linear cold cathode fluorescent lamps (CCFLs) and light emitting diodes (LEDs) are examples of light sources that may be used to supply light to a light guide; in general, any suitable light source may be used. In a typical light guide, light propagates within the light guide for some distance, often exploiting the phenomenon of total internal reflection, and is eventually coupled out of the light guide though a major surface.

As manufacturers of electronic devices incorporating LCDs strive to produce smaller packages, thinness has become a design goal for LCDs and components of LCDs. In general, progress in size reduction may vary by type of component; in particular, progress in reducing the thickness of light guides has not necessarily been matched by reductions in sizes of light sources. This mismatch can present issues for coupling light from light sources into light guides. In this disclosure, we discuss new solutions to address these issues.

Figure 1:
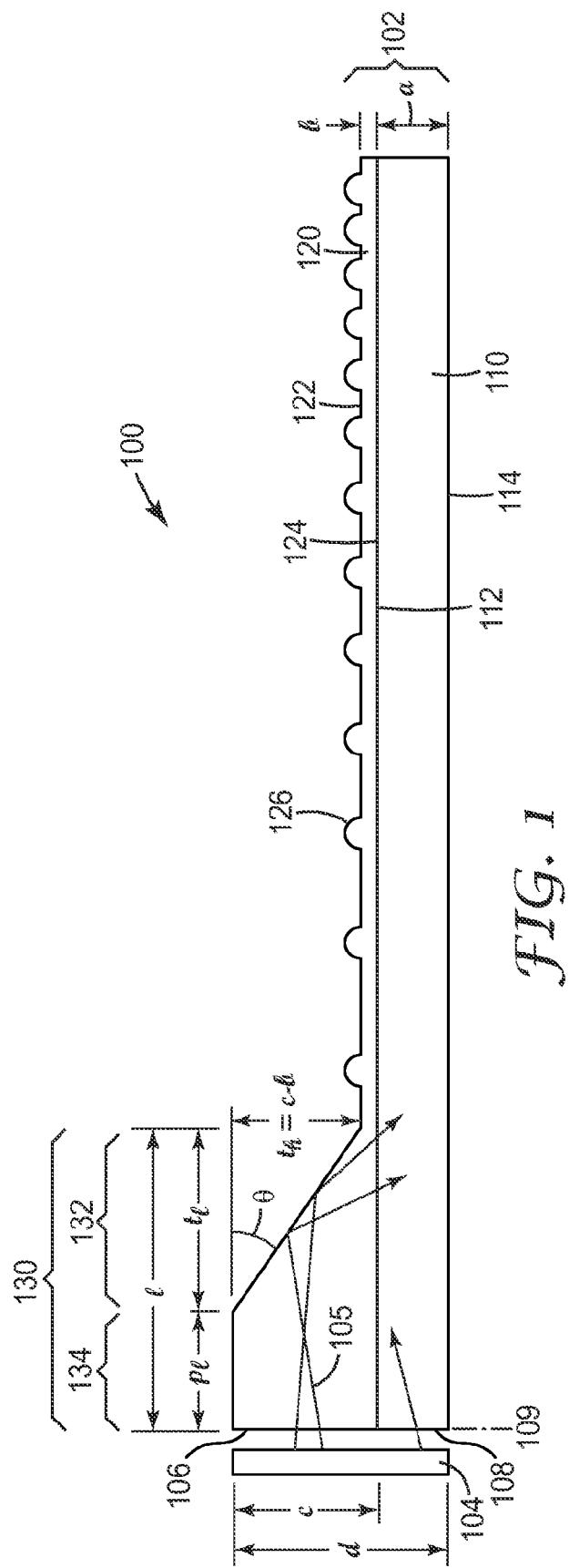
FIG. 1 is a schematic side view of a backlight system.

FIG. 1 is a schematic side view of a backlight system 100. Backlight system 100 includes a light guide 102 and one or more exterior light sources 104 disposed proximate a light guide input edge 106, 108 such that the exterior light sources may emit light 105 into the light guide via the input edge. In the exemplary embodiment shown in FIG. 1, exterior light source 104 is illustrated as being physically separated from the light guide 102. In general, exterior light sources 104 and the light guide 102 may be in contact, or another material or materials may couple them optically and/or physically.

The light guide 102 includes a first flexible layer or substrate 110 of thickness a having opposing first 112 and second 114 major surfaces, and a second flexible layer 120 of thickness b having its own opposing first 122 and second 124 major surfaces. The thickness b of second flexible layer 120 is taken to be the thickness of the "land" of the second flexible layer, which is the portion of the layer excluding protruding structures, such as features 126 and 130, which are discussed in greater detail elsewhere herein. First major surface 112 of first flexible layer 110 may be in physical contact with second major surface 124 of second flexible layer 120. In some embodiments, substantially the entire first major surface 112 is in contact with substantially the entire second major surface 124. Flexible light guides are described in co-owned and co-pending U.S. Patent Application Publication Nos. 2007/0279935, "Flexible Light Guide," (Gardiner, et al.), and 2008/0232135, "Light Guide," (Kinder, et al.) both of which are hereby incorporated by reference in their entirety.

Flexible layers 110 and 120 may be formed from substantially optically transparent material. Exemplary materials include glass or polymeric materials such as cyclic olefin co-polymers (COC), polyester (e.g., polyethylene naphthalate (PEN), polyethylene terephthalate (PET), and the like), polyacrylate, polymethylmethacrylate (PMMA), polycarbonate (PC), or any other suitable polymeric material. In some embodiments, flexible layers 110 and 120 are formed from different materials. In other embodiments, flexible layers 110 and 120 are formed of the same or similar materials.

Illustrative examples of materials suitable for the composition of the second flexible layer 120 of the present disclosure are those resin compositions that are capable of being polymerized by a free radical polymerization mechanism by exposure to radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Suitable resins may be blends of photoinitiator and at least one compound bearing an acrylate group.

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of resins that may be used in embodiments of the present disclosure.

First flexible layer 110 has a first index of refraction $n_1$ and second flexible layer 120 has a second index of refraction $n_2$ where $n_1$ and $n_2$ can, for example, be indices of refraction in the visible range of the electromagnetic spectrum. In one embodiment, $n_1$ is less than or equal to $n_2$. In some applications, $n_1$ is less than or equal to $n_2$ for both S-polarized and P-polarized incident light. In another embodiment, $n_1$ is greater than $n_2$.

In some embodiments, at least one of first flexible layer 110 and second flexible layer 120 is isotropic in refractive index. In some applications, both layers are isotropic.

In some embodiments, first flexible layer 110 and/or second flexible layer 120 are thin enough to be capable of bending without damage to a radius of curvature down to about 100, or 50, or 30, or 15, or 10, or 5 mm.

In some embodiments, the thickness a of the first flexible layer 110 is at least 5, or 10, or 20, or 40 times the thickness b of the second flexible layer 120.

In some embodiments, the thickness a of the first flexible layer 110 is no greater than 1000, or 700, or 500, or 400, or 250, or 200, or 100, or 50, or 25 micrometers.

In some embodiments, the thickness b of the second flexible layer 120 is no greater than 100, or 50, or 15, or 10, or 5, or 1 micrometers.

In some embodiments, first flexible layer 110 is self-supporting while second flexible layer 120 is not. Here, "self-supporting" refers to a film that can sustain and support its own weight without breaking, tearing, or otherwise being damaged in a manner that would make it unsuitable for its intended use.

First flexible layer 110 may be in the form of a uniformly thick slab, as shown schematically in FIG. 1, in which case, first and second major surfaces 112 and 114 are substantially parallel. In some applications, however, first flexible layer 110 may be in the form of a wedge or other layer of non-uniform thickness. In general, the thickness of a layer of non-uniform thickness may be described as the average thickness of the land portion of that layer.

Second flexible layer 120 may integrally include a plurality of discrete light extractors 126 capable of extracting light propagating in the light guide 110. In the exemplary embodiment shown in FIG. 1, the extractors 126 are substantially hemispherical protrusions from first major surface 122. The hemispherical extractors 126 may couple out light propagating in the light guide 102. Such light may otherwise be contained within the light guide 102 by total internal reflection between first surface 122 and second surface 114. In other embodiments, the extractors may take other forms, so long as they are capable of coupling light out of the light guide.

Although the extractors 126 are illustrated in the embodiment of FIG. 1 as having a uniform shape, in general, a light guide 102 may include extractors of different and varying shapes and sizes. Furthermore, the spacing of extractors 126 may vary at different locations on first surface surface 122. Such variations can be useful for controlling amount of light extracted at different locations on first major surface 122. In general, a backlight designer may pre-determine an extraction pattern for light from a light guide. In some embodiments, the pre-determined extraction pattern results in a uniform luminance distribution of light over the first major surface 122 or over a substantial portion thereof. In other embodiments, the pre-determined extraction pattern may result in a non-uniform luminance distribution. Extraction from light guides is discussed in co-owned and co-pending U.S. Patent Application disclosed elsewhere herein, and in U.S. patent application Ser. No. 61/117,382 filed on Nov. 24, 2008, "Light Guides with Flexible Extraction Pattern Layouts and Methods for Forming Light Guides," which is hereby incorporated by reference in its entirety.

Second flexible layer 120 integrally includes, disposed along an edge 109 of the light guide 102, an input edge coupler 130 capable of bringing light from the one or more exterior light sources 104 into propagation within the light guide 102. The input edge coupler 130 may include an input edge coupler input edge 106 having an input edge thickness c disposed along the edge 109 of the light guide 102. As illustrated in FIG. 1, the light guide input edge includes both the input edge coupler input edge 106 and a first flexible layer input edge 108, both of which are suited to receive light from the external light source 104. The input edge coupler 130 may include a taper region 132, where second flexible layer 120 tapers in thickness from the thickness c to the second flexible layer land thickness b over a taper region length $t_l$. In a case where a taper region transitions from a thickness c to the surface of a wedged-shaped layer or substrate, the input edge coupler tapers down in the taper region to the local thickness of the land of the wedge-shaped layer.

In the exemplary embodiment illustrated in FIG. 1, the taper region 132 is shown to vary in thickness linearly. As the thickness decreases by a change in taper height $t_h$=c−b over the taper region length $t_l$, the taper region is characterized by a taper angle θ as defined in FIG. 1. In other embodiments, the taper region 132 may vary non-linearly as it transitions from the thickness c down to the second flexible layer 120 thickness b. An example of a non-linearly varying taper region is represented schematically in FIG. 3.

The input edge coupler 130 also may include a plateau region 134 having a plateau thickness also having the value c, disposed between the input edge 106 and the taper region 132. The plateau region 134, being adjacent input edge 106, may be considered to be disposed along the edge 109 of the light guide 102. In the absence of an input edge 106, plateau region 134 may still be considered to be disposed along the edge 109 of the light guide 102. The plateau region 134 also may be characterized by a plateau region length $p_l$, as illustrated in FIG. 1.

The input edge coupler 130 may improve coupling of light 105 into the light guide 102 from the exterior light source 104, as compared to an otherwise similar light guide without an input edge coupler. Such a comparative light guide would present a light guide input edge having a thickness of about a+b (i.e., the combined thickness of the first and second flexible layers) to light propagating toward the light guide. In the exemplary embodiment illustrated in FIG. 1, light 105 is emitted from the external light source 104 from a light emitting surface having a height d. The mismatch between d and a+b may result in inferior coupling compared to the backlight 100 having a lightguide 102 that presents a light guide input edge of thickness a+c (i.e., the combined thickness of the input edge coupler input edge and the first flexible layer) to the light 105 originating from the external light source 104, when a+c is better matched to the height d of the light emitting surface.

In some embodiments, the thickness of a light guide input edge (e.g., a+c for the light guide 102 of FIG. 1, and more generally, the thickness of the entire input edge of any light guide of the present disclosure) is at least 500, 400, 300, 200, 100, 75, or 50 micrometers.

In some embodiments, the ratio of the thickness of the light guide input edge to the thickness of the light guide (e.g., a+b for the light guide 102 of FIG. 1, and more generally, the sum total of the land thicknesses of the layers of a light guide for any light guide of the present disclosure) is at least 24:1, 20:1, 16:1, 12:1, 8:1, 4:1, 2:1, or 1:1.

In general, the geometry of an input edge coupler will be influenced by a number of considerations, which include the amount of available space and optical performance. In some embodiments, the length l of an input edge coupler, as shown in FIG. 1, does not exceed 0.5, 1, 2, 3, 4, or 5 mm.

A computational study of efficiency of injecting light into light guides having input edge couplers was performed. The model system was similar to that represented in FIG. 1, with the following details: The light emitting source 104 was taken to emit light from a surface d=600 micrometers high with a lambertian distribution. The light guide input edge of thickness a+c was equal to d in all modeled systems. The first flexible layer 110 material was polycarbonate with refractive index 1.580 and absorption coefficient α=0.0015 mm$^{-1}$. The second flexible layer 120 material was UV-cured acrylate resin with refractive index 1.567 and absorption coefficient α=0.0043 mm$^{-1}$. No extractors 126 were modeled. A 100% specularly reflecting mirror, not shown in FIG. 1, was disposed adjacent the second major surface 114 of the first flexible layer 110, separated by an airgap. For three different first flexible layer 110 substrate thicknesses, the taper angle θ was varied (the input edge coupler length l thus varied accordingly; there was no plateau) and the amount of light propagating in the light guide at the end opposite the light source was computed via monte carlo ray tracing using LightTools software from Optical Research Associates, Pasadena, Calif.

Figure 10:
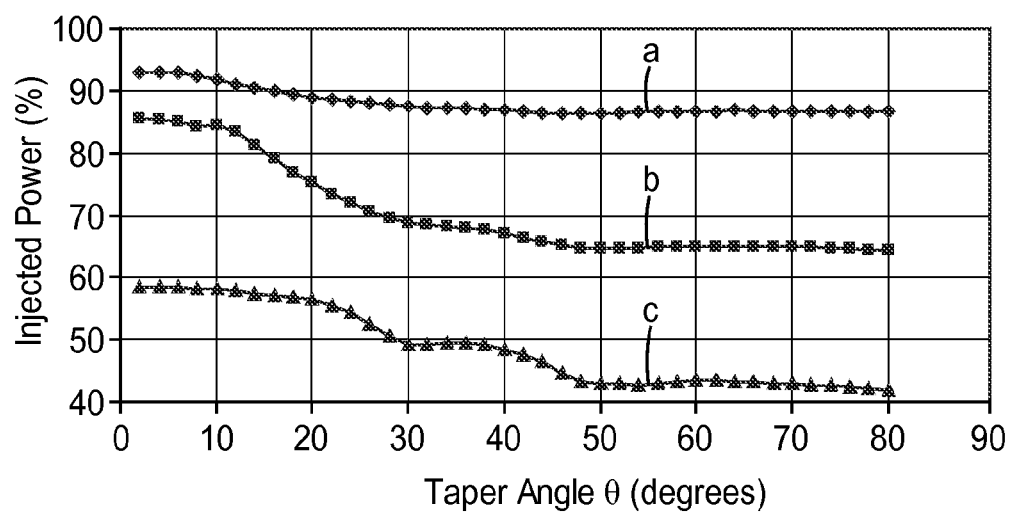
FIG. 10 is a plot of computed performance of light guides.

Results from the computational study are shown in FIG. 10, a plot of the percent of light emitted by the source injected into light guide and reaching the end of the light guide opposite the light source as a function of taper angle θ of the input edge coupler, for first flexible layer thicknesses of 550 micrometers (curve a), 400 micrometers (curve b), and 250 micrometers (curve c). The land thickness of the second flexible layer was 5 micrometers. Each of curves a, b, and c exhibits an essentially monotonic decrease in injected power (or injection efficiency) as the taper angle θ increases, with an initial portion of each curve (i.e., at low values of θ) showing a relatively gradual decline in injected power, then transitioning to a more rapid decline in injected power as θ increases further. A light guide designer may select a value for the taper angle θ so as to remain in a regime of higher efficiency, before the downward slope steepens. In some embodiments, a maximum value for taper angle θ of 6 degrees, 8 degrees, or 10 degrees may be chosen. Another design consideration is that small values of θ imply longer input edge coupler lengths l for a fixed input edge thickness. In other embodiments, a minimum value for taper angle θ of 1, 2, 3, 4, or 5 degrees may be chosen. In still other embodiments, the taper angle θ may reside in a range spanning any combination of minimum and maximum values disclosed herein, such as from 1 to 10 degrees, 3 to 6 degrees, 2 to 8 degrees, and so on.

Figure 2:
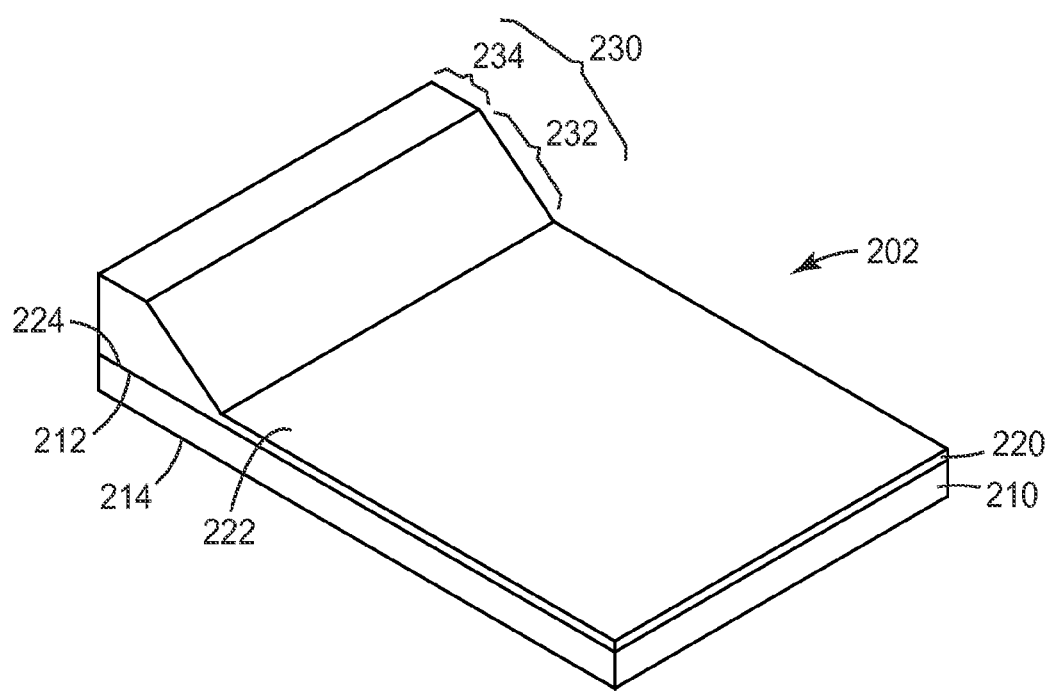
FIG. 2 is a schematic isometric view of a light guide.

FIG. 2 is a schematic isometric view of an exemplary embodiment of a light guide 202 having an input edge coupler 230. Light guide 202 exhibits many of the same features as light guide 102 of FIG. 1, and corresponding features are marked with corresponding part numbers. While extractors are not illustrated on first major surface 222 of second flexible layer 220, in general first major surface 222 may include any suitable extractors in any suitable distribution.

Figure 3:
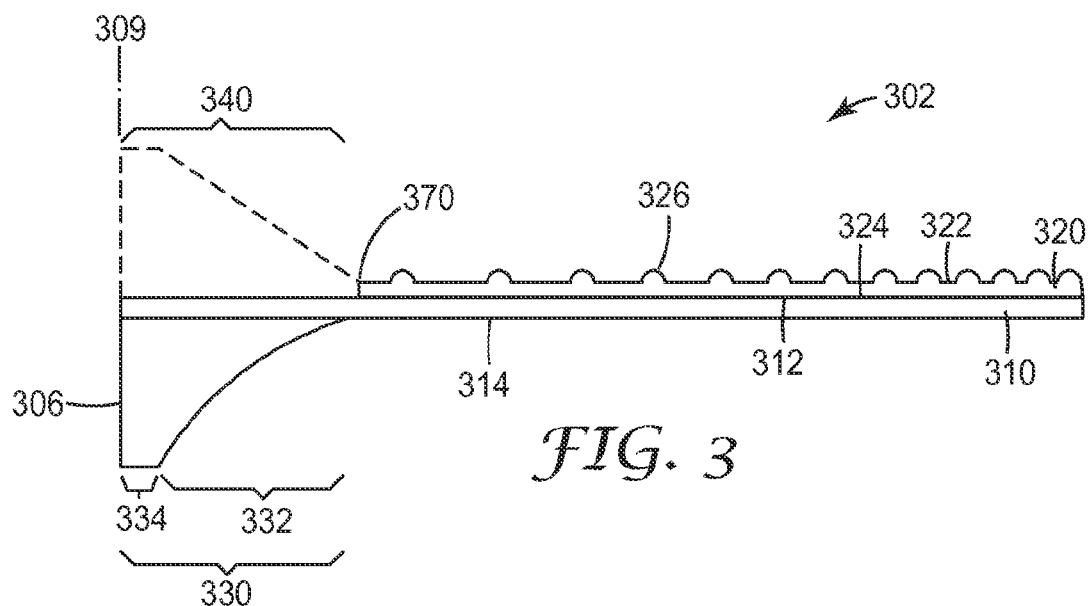
FIG. 3 is a schematic side view illustration of a light guide.
Figure 4:
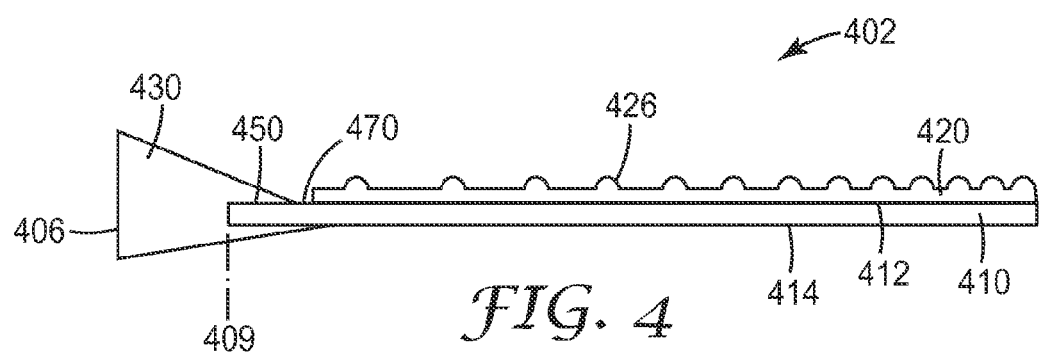
FIG. 4 is a schematic side view illustration of a light guide.
Figure 5:
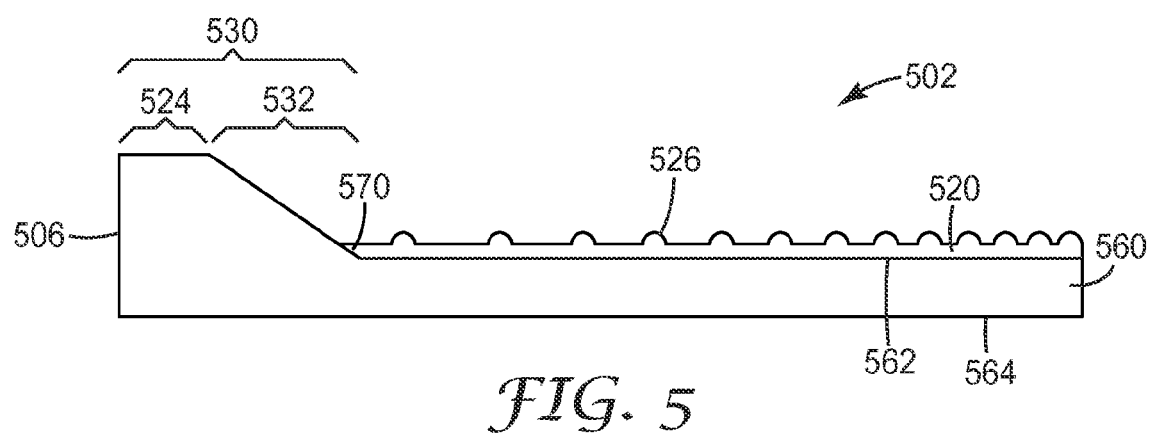
FIG. 5 is a schematic side view illustration of a light guide.

FIGS. 3, 4, and 5 present schematic side views of exemplary embodiments of light guides with input edge couplers exhibiting possible variations in light guide designs. In general, any variation, feature, or characteristic represented in any of the figures of this disclosure and/or described in the detailed description may be included in any other light guide disclosed herein to the extent that the variation is compatible with the light guide.

FIG. 3 is a schematic side view illustration of an exemplary embodiment of a light guide 302 that includes a substrate 310 having opposing first 312 and second 314 major surfaces. Light guide 302 may also include a layer 320 having its own opposing first 322 and second 324 major surfaces. Layer 320 may be continuous, in which all portions of the layer are connected. A continuous layer may include holes in the layer, but a continuous layer may not include floating islands of unconnected layer material. Layer 320 may include a plurality of discrete light extractors 326 disposed on its first major surface 322. When layer 320 includes extractors 326, it may be referred to as an extraction layer. Second major surface 324 of layer 320 may be in physical contact with substrate 310 over substantially all of first major surface 312, or there may be a mismatch in the areas of corresponding major surfaces 324 and 312, as illustrated in FIG. 3. In other embodiments, an extraction layer may include extractors not included in a continuous layer.

Light guide 302 includes an input edge coupler 330 and/or 340 disposed along an edge 309 of light guide 302 and substrate 310. Input edge coupler 330 may be in physical contact with the second major surface 314 of the substrate 310 as illustrated, or an input edge coupler 340 may be in physical contact with the first major surface 312 as illustrated in phantom outline. In other embodiments, both input edge couplers 330 and 340 may be included in a light guide. Furthermore, input edge couplers 330 and 340 may be considered collectively and referred-to in the singular as an input edge coupler. An input edge coupler of the exemplary embodiment may include an input edge, such as input edge 306, may include a taper region such as 332, and may include a plateau region such as 334. Each of input edge couplers 330 and 340 may be described with its own input edge thickness. If the input edge couplers 330 and 340 are described collectively as a singular input edge coupler, then the input edge thickness will include the thicknesses of the components 330, 340, as well as the thickness of the substrate 310. Taper region 332 may taper in thickness from the plateau region 334 or input edge 306 to the second major surface 314 with any suitable taper profile, including a linear or non-linear profile (as shown). In general, either of input edge couplers 330 and 340 may include any suitable and compatible feature described for any input edge coupler in this disclosure.

In the exemplary embodiment shown in FIG. 3, the input edge coupler(s) 330 and 340 may be formed from a different material than the substrate 310. In general, in various embodiments of the present disclosure, input edge couplers, substrates, and layers may be formed from any suitable and compatible combination of like, unlike, or similar materials, such as those disclosed herein in connection with flexible layers 110 and 120 of FIG. 1.

FIG. 4 is a schematic side view illustration of an exemplary embodiment of a light guide 402 that includes a substrate 410 and an input edge coupler 430, and that may include a layer 420, which may be an extraction layer with a plurality of extractors 426. The input coupler 430 may be formed from the same material or a different material than the substrate 410. Input edge coupler 430 schematically represents a number of input edge coupler configurations that may be used in light guide 402. Variations in input edge coupler configuration include the inclusion or exclusion of features such as plateau regions, as described herein in connection with input edge couplers used with other exemplary light guides. Another variation is the thickness of the input edge coupler's input edge 406, and the positioning of the input edge relative to the substrate 410. As illustrated, input edge coupler 430 is asymmetrical with respect to major surfaces 412 and 414 of substrate 410, including exhibiting different taper angles on opposite sides of the substrate. In other embodiments, input edge coupler 430 may be symmetrical. The input edge coupler 430 is disposed along an edge 409 of the substrate 410. Substrate 410 and input edge coupler 430 have generally corresponding geometries along a mating zone 450. The substrate 410 and input edge coupler 430 may be physically connected along the mating zone 450. An additional material (not shown) may be disposed between the substrate 410 and input edge coupler 430. This additional material, such as an optical adhesive, may act to mechanically and/or optically couple the two structures.

FIG. 5 is a schematic side view of an exemplary embodiment of a light guide 502. Light guide 502 includes a substrate 560 having first 562 and second 564 opposing major surfaces, and integrally comprising a tapered input edge coupler 530. Substrate 560 may be manufactured by any suitable method, for example, injection molding. Tapered input edge coupler 530 includes a taper region 532 and may or may not include a plateau region 534. Tapered input edge coupler 530 has an input edge 506 having an input edge thickness. Light guide 502 may include a layer 520 in physical contact with substrate 560, which may be an extraction layer with a plurality of extractors 526. In other embodiments, extractors not connected by a layer may be disposed on a substrate 560 having an integral input edge coupler 530. Such extractors may be formed on the substrate 560 by, for example, ink jet printing, silk screen printing, rotogravure printing, or any other suitable process.

In FIGS. 3, 4, and 5, light guides may include input edge couplers, such as input edge couplers 340, 430, and 530, which may adjoin layers that may be formed separately from input edge couplers, such as layers 320, 420, and 520. These input edge couplers and layers may adjoin in regions such as regions 370, 470, and 570. In general, the transition between input edge coupler and layer in regions such as 370, 470, and 570 may be more or less smooth, which may or may not significantly impact light guide performance. The nature of these transitions may vary from one embodiment to another, and the possibilities depicted in FIGS. 3, 4, and 5 are meant merely to be exemplary, and not limiting.

Light guides of the present disclosure can be manufactured using any suitable manufacturing method, such as UV cast and cure, extrusion such as extrusion casting, co-extrusion, or other known methods. As an example, light guide 102 of FIG. 1 can be manufactured by co-extruding flexible layers 110 and 120, followed by a compression molding step during which extractors 126 and input edge coupler 130 are formed.

In another example, light guides are manufactured in a web-based process. In such a process, the web includes a flexible substrate corresponding, for example, to a first flexible layer of one of the light guides disclosed herein. Another flexible layer may be continuously cast, microreplicated, or otherwise disposed onto the substrate, and microreplication tools may be used to modify the surface of the cast flexible layer to result in, for example, a flexible extraction layer having light guide regions having extraction features and input edge couplers as disclosed herein. Microreplication of extraction features and input edge couplers may or may not be performed simultaneously. Single or multiple tools may be used to microreplicate features onto the surface of the second flexible layer. For example, the extractors 126 and input edge coupler 130 of the light guide 102 of FIG. 1 may be formed by a single tool. In another example, the extractors 326 and input edge coupler(s) 330 and/or 340 of the light guide 302 of FIG. 3 may be formed by separate tools. In addition, the materials for extraction layer 320 and either input edge coupler 330 or 340 may be cast onto substrate 310 together or separately, of the same or different materials, on opposing or the same major surface(s) of the substrate. In some embodiments, a web may include a support layer which may improve handleability of the web. Such a support layer may be attached to the flexible substrate of a web, for example, on the side of the substrate opposite a flexible extraction layer.

Figure 6:
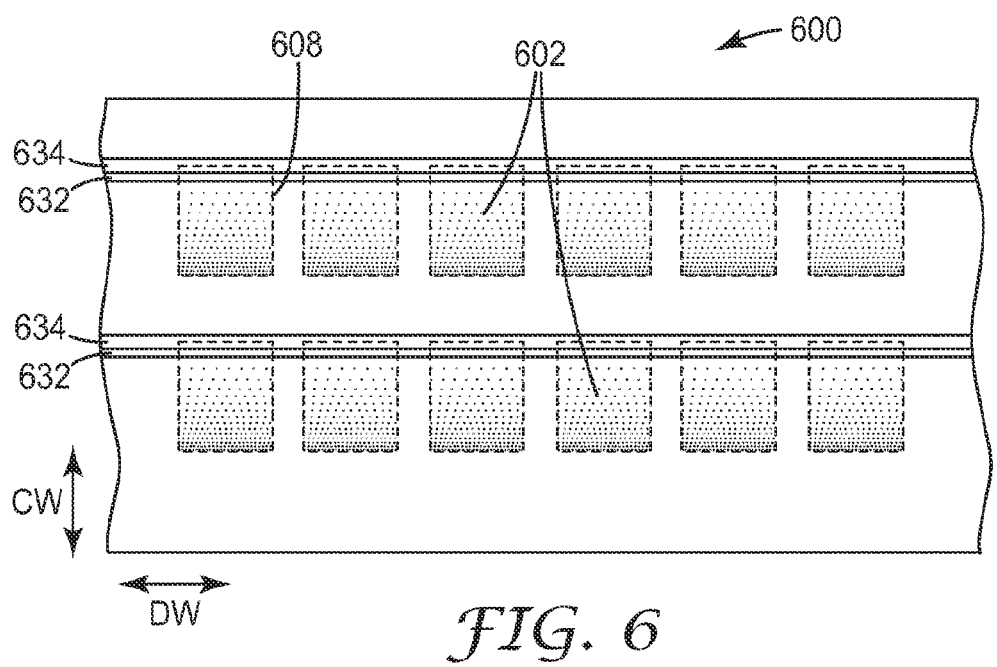
FIG. 6 is a top view of a portion of a web.

FIG. 6 is a top view of a portion of a web 600 having multiple light guide regions 602, each light guide region having a pattern of extractors. Web 600 also has material that can result in input edge couplers, including, possibly, taper regions 632 and plateau regions 634. The dashed line 608 around each light guide region 602 shows where the web 600 will be converted, or cut, to result in individual light guides. Depending on where the web is cut, each light guide may have a different shape or features. For example, a plateau region of a finished input edge coupler may be wider, narrower, or non-existent, depending on the placement of the cut along the input edge of the light guide.

Figure 7:
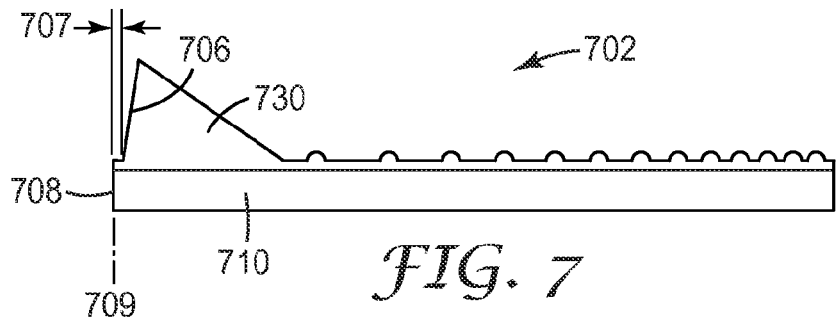
FIG. 7 is a schematic side view of a light guide.

FIG. 7 is a schematic side view of a light guide after, for example, conversion from a web. Substrate input edge 708 may result from a cut made at the edge 709 of the light guide 700. In this exemplary embodiment, a gap 707 exists due to the offset of the cut at edge 709 relative to the input edge coupler 730. In this embodiment, substrate input edge 708 and input edge coupler input edge 706 are not coplanar. In other embodiments, such as light guide 102 shown in FIG. 1, for example, input edges 106 and 108 may be coplanar, as may result, for example, from a cut made during conversion forming both edges. Tolerances for aligning a cut forming an input edge may be eased by placing the cut in a plateau region, such as plateau region 634 of web 600 of FIG. 6. Tolerances may be more stringent for converting light guides having input edge couplers without plateau regions, such as light guide 702 of FIG. 7, particularly if it is desired to minimize the gap 707.

FIG. 7 also illustrates that input edge coupler input edge 706 may be sloped or shaped, a variation that may be included in any compatible light guide of the present disclosure. Such shaping of the input edge 706 may be accomplished in some cases via microreplication and in some cases via conversion. The thickness of the input coupler input edge 706 is taken to be the greatest thickness of the input edge coupler 730 relative to the substrate 710.

Figure 8:
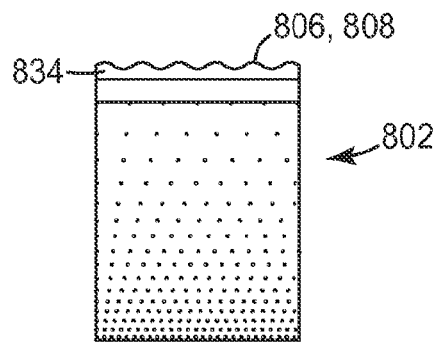
FIG. 8 is a schematic top view of a converted light guide.

FIG. 8, which is a schematic top view of a converted light guide 802, illustrates that shape may be imparted to the input edge 806, 808 of the light guide along the edge. This shaping of input edge 806, 808 may be imparted via a cut into plateau region 834 and substrate made during conversion of light guide 802 from a web. Co-owned and co-pending U.S. patent application Ser. No. 61/117,389 filed on Nov. 24, 2008, "Web converting methods for forming lightguides and the light guides formed therefrom," hereby incorporated by reference in its entirety, describes methods that may be useful for adding structure to a light guide edge. Any other suitable method may be used to add structure to a light guide edge, as well.

In addition to the macroscopic shape that may be imparted to an edge of a light guide, microscopic structure, or microstructure, may also be imparted to a light guide edge by a cut made during conversion, as disclosed, for example, in co-owned and co-pending U.S. patent application Ser. No. 61/117,389 filed on Nov. 24, 2008, "Web converting methods for forming lightguides and the light guides formed therefrom." Different edges of a light guide may be formed by different cutting or edge-forming methods, and hence, different edges of a light guide may exhibit differing microstructures. In one embodiment, the input edge of a light guide is formed by a method different than the method used to form at least one other edge of the light guide, and consequently, the input edge of the light guide exhibits different microstructure than at least one other edge of the light guide. In another embodiment, the input edge of a light guide exhibits a first type of microstructure, and all of the other edges of the light guide exhibit a second type of microstructure. In as far as a light guide may comprise multiple layers, an edge, such as an input edge, may comprise multiple sections, such as an input edge coupler input edge and a first flexible layer input edge. Microstructure of the aforementioned type may be exhibited on any section of any edge.

An input edge coupler may be further shaped in ways particularly compatible with microreplication manufacturing. The thickness c of an input edge coupler, as denoted, for example, in FIG. 1, may be varied along the input edge of a light guide. Referring to FIG. 6, this thickness variation may be achieved, for example, by varying the height of the plateau 634 and taper regions 632 along the downweb direction (DW). This variation in plateau 634 and taper region 632 height may be achieved, in turn, by varying the depth of a corresponding feature in a microreplication master. Tracing back further, the corresponding feature in the microreplication master may be created by a diamond-tipped cutting tool whose depth in the microreplication master can be easily modulated. In the same way, such a diamond-tipped cutting tool may be modulated in position crossweb (CW) to add structure in that direction. Furthermore, simultaneous depth and crossweb variation in tool position may be employed as the input edge coupler microreplication master is cut downweb. Methods of making microreplication masters with diamond cutting tools are described in co-owned and co-pending U.S. Patent Application Publication No. 2007/0047254, "Illumination Assembly and System," (Schardt, et al.), which is hereby incorporated by reference in its entirety.

In a web-based manufacturing processes for production of light guides of the present disclosure, webs bearing multiple light guides may be produced for which the downweb (DW) dimension of the web or substrate of the web is many multiples of the crossweb (CW) dimension. In some embodiments, the ratios of the downweb dimension to the crossweb dimension may be greater than 10:1, 100:1, or 1000:1.

Figure 9:
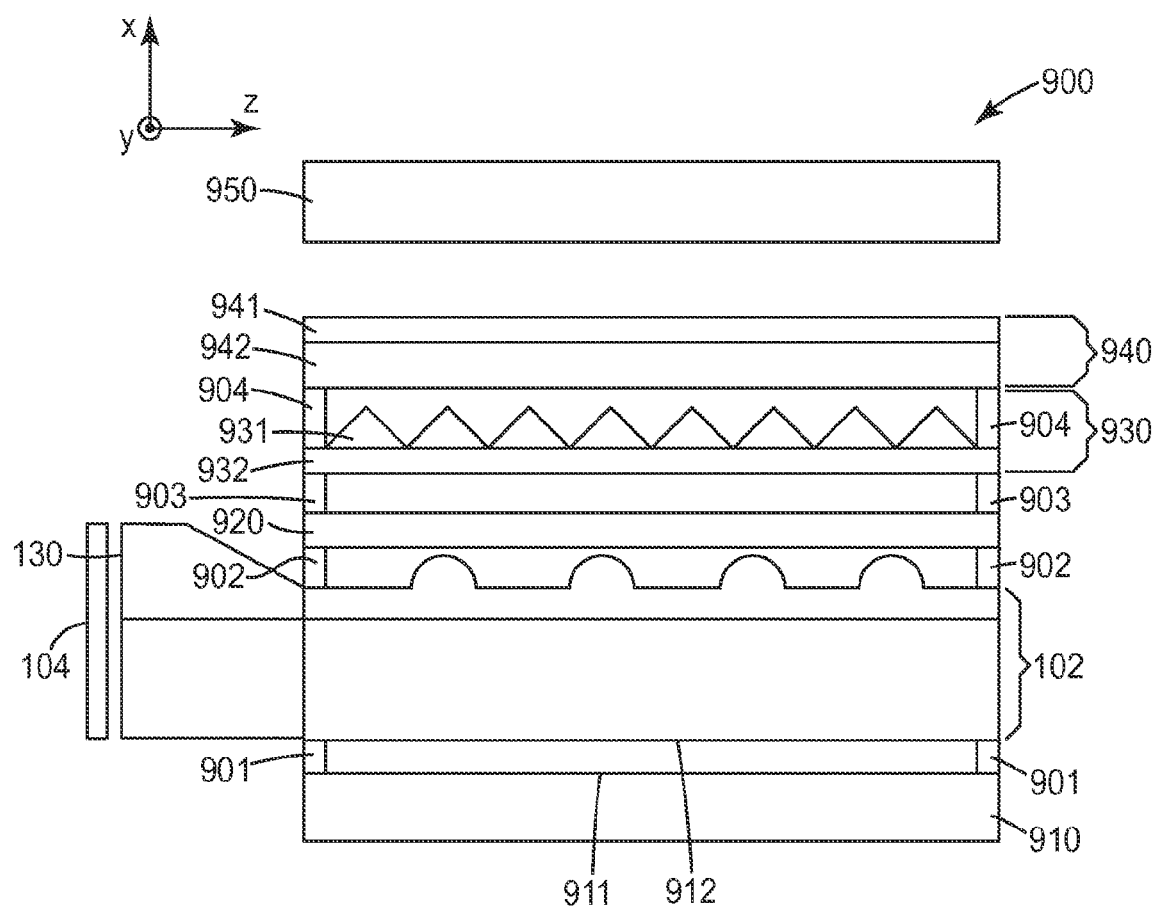
FIG. 9 is a schematic side-view of a display system.

FIG. 9 shows a schematic side-view of a display system 900 in accordance with one embodiment of this disclosure. Display system 900 includes light guide 102 having an input edge coupler 130, a diffuser 920, a first light redirecting layer 930, a second light redirecting layer 940, and a light valve panel 950 such as a liquid crystal panel. Display system 900 further includes a reflector 910 attached to light guide 102 by adhesive 901. Diffuser 920 is attached to light guide 102 and first light redirecting layer 930 with adhesives 902 and 903, respectively. Furthermore, first and second light redirecting layers 930 and 940 are attached by adhesive 904.

FIG. 9 shows adhesives 901-904 placed along opposite edges of display system 900. In general, each adhesive can be placed at one or multiple locations to provide adequate attachment between adjacent layers. For example, an adhesive may be placed along all edges of neighboring layers. In some applications, an adhesive may be placed at discrete locations along the periphery of adjacent layers. In some other applications, an adhesive may cover entire surfaces of adjacent layers. For example, adhesive 901 may cover substantially the entire surfaces 911 and 912 of reflector 910 and light guide 102, respectively. In some embodiments, in contrast, some or all of adhesives 901-904 may be omitted.

Light redirecting layer 930 includes a microstructured layer 931 disposed on a substrate 932. Similarly, light redirecting layer 940 includes a microstructured layer 941 disposed on a substrate 942. Light redirecting layers 930 and 940 can be conventional prismatic light directing layers previously disclosed, for example, in U.S. Pat. No. 4,906,070 (Cobb) and U.S. Pat. No. 5,056,892 (Cobb). For example, microstructured layer 931 can include linear prisms extended linearly along the y-axis and microstructured layer 941 can include linear prisms extended linearly along the z-axis.

The operation of a conventional light redirecting layer has been previously described, for example, in U.S. Pat. No. 5,056,892 (Cobb). In summary, light rays that strike the structures in microstructured layers 931 and 941 at incident angles larger than the critical angle are totally internally reflected back and recycled by reflector 910. On the other hand, light rays which are incident on the structures at angles less than the critical angle are partly transmitted and partly reflected. An end result is that light redirecting layers 930 and 940 can result in display brightness enhancement by recycling light that is totally internally reflected.

The exemplary embodiment shown in FIG. 9 includes a number of adhesive layers such as adhesive layers 902 and 903. In some applications, one or more or all of the adhesive layers in display system 900 may be eliminated. For example, in some applications adhesive layers 902, 903, and 904 may be eliminated in which case the remaining layers may be aligned with respect to each other by other means such as by aligning the edges of the layers or by including alignment tabs.

Illustrative embodiments of this disclosure are discussed and in many cases, reference has been made to possible variations within the scope of this disclosure. Other variations and modifications in the disclosure may be apparent to those skilled in the art without departing from the scope of the disclosure, and it should be understood that this disclosure is not limited to the illustrative embodiments set forth herein.

What is claimed is:

1. A web, comprising:
 a flexible substrate having a flexible substrate thickness and opposing first and second major surfaces, the flexible substrate having a ratio of downweb dimension to crossweb dimension of at least 10:1; and
 a flexible extraction layer having a flexible extraction layer thickness and opposing first and second major surfaces, wherein the first major surface of the flexible substrate is in physical contact with the second major surface of the flexible extraction layer, and wherein the flexible extraction layer further comprises:
 a plurality of spaced apart light guide regions, each light guide region comprising:
  a plurality of discrete light extractors capable of extracting light propagating in the flexible substrate such that light is extracted in a pre-determined extraction pattern over the light guide region of the flexible extraction layer; and
 a plurality of spaced apart input edge couplers, each input edge coupler, comprising:
  a plateau region disposed along an edge of a corresponding light guide region, characterized by a plateau thickness; and
  a taper region adjacent the plateau region;
 wherein the web may be converted to result in a plurality of light guides.

2. The web of claim 1, further comprising a support layer attached to the flexible substrate.

* * * * *

UNITED STATES PATENT AND TRADEMARK OFFICE
CERTIFICATE OF CORRECTION

PATENT NO. : 8,882,328 B2
APPLICATION NO. : 13/130528
DATED : November 11, 2014
INVENTOR(S) : Kinder It is certified that error appears in the above-identified patent and that said Letters Patent is hereby corrected as shown below:

In the Specification,

Column 5
Line 27, after "first" insert -- major --

Line 34, delete "surface" and insert -- major --

Line 46, after "61/117,382" insert -- having Attorney Docket No. 63783US002 --

Column 10
Line 32, after "61/117,389" insert -- having Attorney Docket No. 64035US002 --

Line 43, after "61/117,389" insert -- having Attorney Docket No. 64035US002 --

Signed and Sealed this
Fourteenth Day of April, 2015

Michelle K. Lee
*Director of the United States Patent and Trademark Office*